United States Patent
Kalmon

[15] 3,653,446
[45] Apr. 4, 1972

[54] DRAFT AND POSITION CONTROL FOR TRACTOR DRAWN IMPLEMENTS

[72] Inventor: Dennis H. Kalmon, Eden Prairie, Minn.
[73] Assignee: White Farm Equipment Company
[22] Filed: July 24, 1969
[21] Appl. No.: 844,481

[52] U.S. Cl. ........................172/4, 172/9, 172/10
[51] Int. Cl. ........................................A01b 63/112
[58] Field of Search ............172/2, 3, 4, 4.5, 7, 8, 9, 172/10, 11, 12; 91/406, 407; 60/50 HE

[56] References Cited

UNITED STATES PATENTS

| | | | |
|---|---|---|---|
| 2,778,343 | 1/1957 | Crosetto et al. | 91/407 |
| 2,846,980 | 8/1958 | Vltavsky | 91/406 |
| 2,991,759 | 7/1961 | Pilch | 60/52 HE |
| 2,996,125 | 8/1961 | Bunting | 172/4 |
| Re 25,512 | 1/1964 | Presnell et al. | 172/9 |
| 3,132,699 | 5/1964 | Brudnak et al. | 172/9 |
| 3,171,496 | 3/1965 | Nelson | 172/9 |
| 3,194,319 | 7/1965 | Faure | 172/9 |
| 3,220,485 | 11/1965 | Cassani | 172/9 |

FOREIGN PATENTS OR APPLICATIONS

| | | | |
|---|---|---|---|
| 225,726 | 9/1959 | Australia | 172/7 |
| 236,892 | 5/1960 | Australia | 172/7 |
| 886,677 | 1/1962 | Great Britain | 172/7 |
| 897,779 | 5/1962 | Great Britain | 172/7 |
| 678,388 | 1/1964 | Canada | 172/7 |

Primary Examiner—Robert E. Pulfrey
Assistant Examiner—C. W. Hanor
Attorney—Watts, Hoffmann, Fisher & Heinke

[57] ABSTRACT

The disclosure pertains to an agricultural tractor having a draft and position responsive hitch control for maintaining an implement at a constant working depth in spite of varying working conditions. The hitch is activated by a power cylinder to vary the working depth of the implement drawn by the tractor. A valve controls the power cylinder and is arranged to receive draft or position command and feedback signals from an actuating linkage including a yoke lever and one-way link which coordinates the command and feedback signals controlling the valve.

10 Claims, 5 Drawing Figures

Patented April 4, 1972

INVENTOR.
DENNIS H. KALMON

BY Watts, Hoffmann,
Fisher & Heinke
ATTORNEYS.

Patented April 4, 1972

INVENTOR.
DENNIS H. KALMON

BY Watts, Hoffmann,
Fisher & Heinke
ATTORNEYS

DRAFT AND POSITION CONTROL FOR TRACTOR DRAWN IMPLEMENTS

BACKGROUND OF THE INVENTION

The invention pertains to the art of hydraulic power lift mechanisms for agricultural tractors having a hitch for attaching an implement which is to be pulled by the tractor. Specifically, the description herein will be with respect to a draft and position responsive control for a three-point tractor hitch, but the invention is equally applicable to an articulated vehicle combination employing a coupling device in which it is desirable to have servo elevational control of the trailing vehicle section relative to the leading section.

1. Field of the Invention

Ordinarily three-point, mast-type hitches have an arrangement of struts extending between the tractor and implement including a pair of parallel lower draft struts which cooperate with a single upper strut, the three struts being connected to an implement mast at three separate points. A power cylinder on the tractor operates a hitch rocker shaft having a pair of spaced crank arms, each being pivotally connected by a drop link to one of the two lower draft struts for raising and lowering the hitch and implement. The two lower draft struts may be pivotally connected at the rear to the tractor. The upper draft strut is pivotally connected to a slidable link having a heavy draft spring which is usually adjustable to vary the draft load sensed by the control. The hitch control actuates the power cylinder to automatically vary the working depth of the implement in response to draft and position signals received by the control.

2. Description of the Prior Art

Heretofore, combined draft and position hitch controls have provided valves and combinations of valves with various activating linkage systems intended to perform the functions outlined above, but these controls are almost invariably complicated involving expensive machined valve parts and intricate linkage systems which are not always reliable and require frequent maintenance. In one form of prior art control valve, the valve housing has numerous directional flow passages controlled by a free floating, spring-biased valve spool having in the order of six or seven annular lands which are shifted to cover or uncover the passages in the valve body for directing fluid flow to and from the power cylinder.

The activating linkages for such a valve employ a series of rocker plates, reciprocating cams, rotating cams and cam followers together with various levers and linkages all designed to coordinate movements of the implement relative to the tractor and transmit a correcting signal to the control valve.

These linkages take up considerable space on the tractor. Moreover, they are particularly sensitive to the wear, shock and abuse of field conditions in which agricultural tractors must operate. It is the overall object of the present invention to provide a simplified control valve and valve actuating mechanism which will be inexpensive to make, reliable in operation, easy to maintain due to its simplicity and minimum number of parts employed and will be less subject to wear and disablement under the rigors of use in the field.

SUMMARY OF THE INVENTION

The invention provides a hitch control especially for agricultural tractor hitches having both position and draft control functions coordinated to effect operation of a power cylinder for actuating the hitch in response to varying working conditions, the control comprising a valve having a closed center equilibrium position shutting off fluid flow to or from the power cylinder when the implement is properly positioned relative to the tractor and an actuating linkage including a yoke lever operated in accordance with the commands of either draft or position signals to shift the valve in one direction or the other from its equilibrium position to raise or lower the implement.

Further in accordance with the invention, position and draft command signals are received on one side of the yoke lever and corresponding feedback signals transmitted by the hitch are received on the other side, the former being selectively effective to control movement responsive to the operator's commands and the latter to restore the valve to its equilibrium position in response to hitch movement. A draft sensitivity adjustment is provided so that the draft feedback signal is variable according to the magnitude of draft forces. Further the linkage is connected with the hitch in such a way as to be responsive to either upper or lower draft struts of the hitch.

Especially where the power cylinder is a single-acting, unidirectional type with fluid pressure being supplied and exhausted from one side of a piston, the invention also provides that fluid discharge from the power cylinder is initially rapid for lowering the implement at a rapid rate and thereafter slowing the descent by diverting fluid flow through a bypass line checking the rate of fluid exhaust until the control valve is restored to its equilibrium position.

Among the advantages of the invention include the provision of a control valve and actuating linkage having an improved response more positively and rapidly adjusting the working depth of the implement in response to changes in working conditions.

Another advantage is in a linkage mechanism designed such that both position and draft control linkage parts are largely housed within a linkage box forming a part of the valve housing providing a compact and simplified control package easily installed on the tractor and coupled to the hitch.

An advantage further resides in the provision of a control valve providing for rapid descent of the implement initially, followed by a slower descent rate until the desired working depth is reached whereby the implement is deployed more rapidly at the working depth then was heretofore possible.

An additional advantage is that the actuating linkage utilizing a yoke lever and one-way link to control both position and draft movements is more rugged and reliable than prior art linkage systems and thus less subject to damage from shock or wear due to exposure to field conditions.

These and other advantages and objects will become more apparent by referring to the following detailed description and drawings of the preferred embodiment of the invention wherein:

GENERAL ARRANGEMENT

Figure 1:
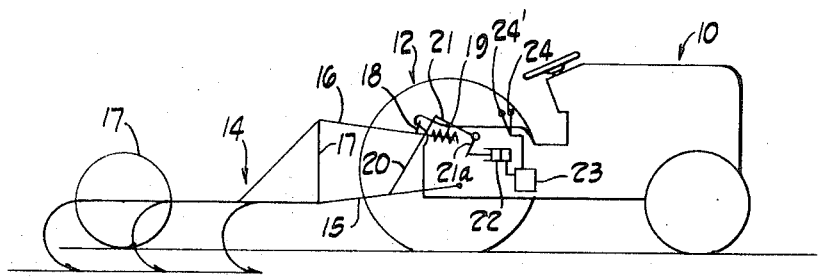
FIG. 1 is an overall schematic showing a tractor, implement and hitch employing the inventive hitch control.

In FIG. 1 is depicted a tractor 10 provided with a hitch 12 adapted to be connected to a draft implement 14 such as a gang plow. The hitch 12 mounts the implement 14 on a pair of lower draft struts 15 and an upper draft strut 16, each being trailingly pivoted on the tractor 10 and releasably coupled to an implement mast 17. The upper strut 16 connects at the tractor end to a rocker arm 18 and heavy draft spring 19. Each lower draft strut 15 is connected intermediate its end to a drop link 20 which is actuated to raise and lower the hitch 12 through a rocker arm 21 connected to a rock shaft 21a driven by a power cylinder 22 operated by commands received from a control 23. The power cylinder 22 is of the unidirectional, single acting type in which fluid is supplied and exhausted from one side of a piston, however, it will be appreciated that a double-acting cylinder may be substituted with appropriate changes in the hydraulic circuit as is well known. The control 23 functions to maintain a constant working depth of the implement 14 relative to the tractor frame. Also, since the draft forces will vary between soft and hard soil conditions and over uneven terrain, the draft control function can be selectively adjusted in coordinated fashion with the position control function to maintain maximum draft and maximum working depth through particular soil conditions. Ordinarily the lower draft struts 15 will be placed in tension and the upper draft strut 16 in compression by the draft forces acting on the implement 14. When the implement is raised to the carry or transport position, only the weight of the implement is supported by the hitch 12 and the forces in struts 15 and 16 are reversed. Either the draft or position control setting may be selectively varied by manually operated control levers 24, 24' to achieve any desired position or draft control function which the operator may choose according to the soil conditions and terrain being worked as described more in detail hereinafter.

THE CONTROL VALVE

Figure 2:
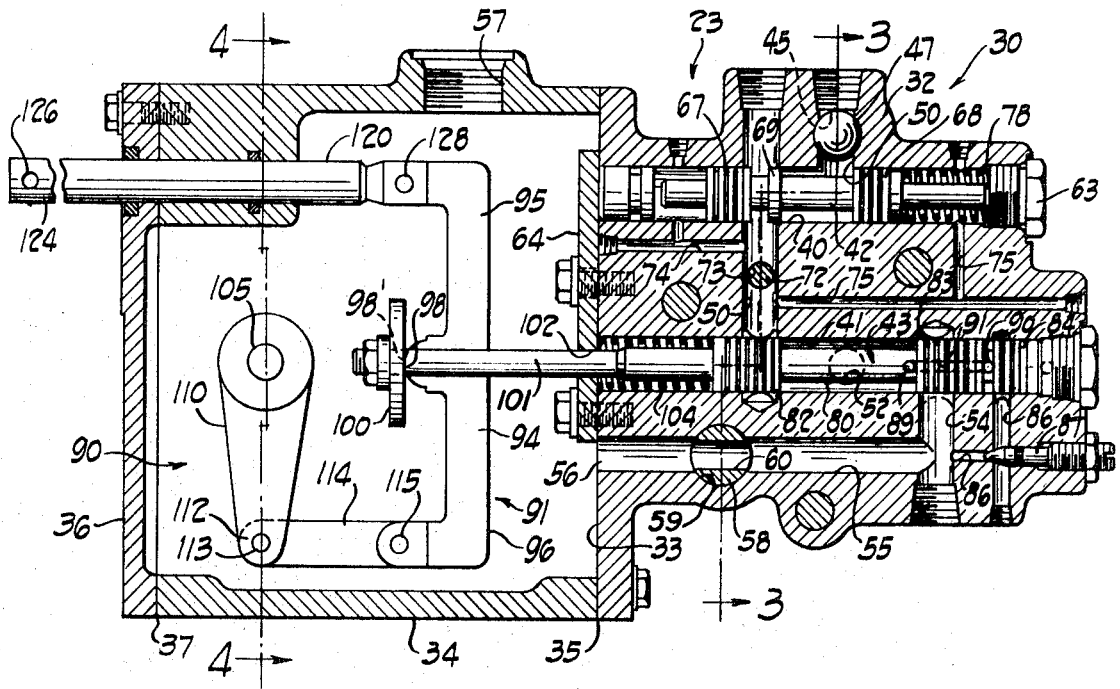
FIG. 2 is a longitudinal, sectional view through the hitch control showing the valve housing and linkage box and the parts of the directional fluid flow control valve and actuating linkage therefor.

The control 23 consists of a control valve 30 comprising a valve housing 32 having a mounting surface 33 on one side to which is bolted a linkage box 34 with a gasket 35 sealing the joint (FIG. 2). The linkage box 34 has a cover plate 36 which is likewise sealed by a gasket 37 so that the linkage box 34 forms with the valve housing 32 an oil-tight unitary structure completely enclosing not only the valve parts, but also the actuating linkage parts in an integrated control assembly which protectively houses all of the vital parts of the control 23. This is an important aspect of the invention as will appear later.

Figure 3:
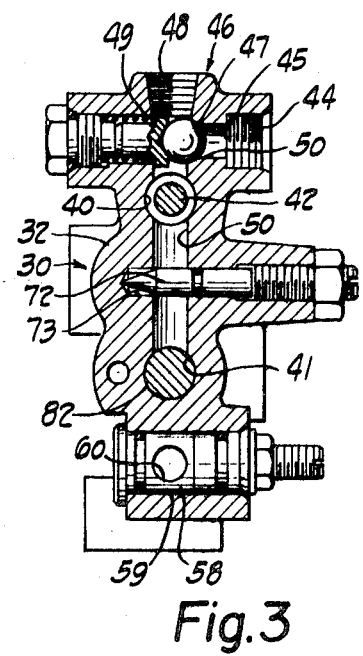
FIG. 3 is a cross-sectional view through the valve taken along line 3—3 of FIG. 2.

Referring now to FIGS. 2 and 3, the valve housing 32 comprises a pair of longitudinally extending bores 40, 41 in which reciprocate respectively, valve spools 42, 43. Valve spool 42 performs a regulating function on the fluid which enters the valve housing 32 under pressure at a fluid inlet 44 connecting with a transverse passage 45 (FIG. 3) having a check valve 46 comprising ball 47, seat 48 and spring 49, situated therein. A vertical passage 50 connects the bores 40, 41 to the fluid supply which, regulated by the valve spool 42, is directed by the directional flow, closed-center valve spool 43 to a fluid outlet 52 in the bore 41 for activating the power cylinder 22 (FIG. 1).

Fluid is exhausted from the power cylinder 22 under pressure created by the weight of the implement 14 back through the outlet 52 and then to an exhaust passage 54 when uncovered by the valve spool 43. Passage 54 connects with a longitudinally extending return passage 55 which opens through the surface 33 of the valve housing at 56 discharging fluid into the interior of the linkage box 34 from which it is returned to a sump through outlet 57. Return flow through passage 55 is regulated by a rate spool 58 rotatably and sealingly received in a transverse bore 59. The spool 58 has a rated orifice 60 which may either be aligned with the passage 55 for maximum return flow and maximum descent rate of the implement 14, or by rotating the spool 58 so that the orifice 60 is at some angle to the axis of passage 55, flow is restricted thereby reducing the allowable descent rate.

Considering the control valve in more detail, the regulating valve spool 42 reciprocates in the bore 40 which is closed at one end by a plug 63 and at the opposite end by a retainer plate 64 bolted on the end of the valve housing. The regulating valve spool 42 comprises a pair of lands 67, 68 which reciprocatively move in the bore 40 on opposite sides of the vertically offset portion of passage 50 (FIG. 2). A third land 69 on the valve spool 42 intermediate the two lands 67, 68 regulates the supply rate of flow according to the axial position of the valve spool 42 in the bore 40. A needle valve 72 (FIG. 3) situated in a transverse bore 73 which intersects with passage 50 restricts fluid flow through the passage 50 and creates a pressure drop between the bores 40, 41. The pressure on the upstream side of the needle valve 72 is communicated through a bore 74 to one side of the valve spool 42 while the pressure on the downstream side of the needle valve 72 is communicated through a bore 75 to the opposite end creating a differential pressure acting on the valve spool 42 in opposition to a coil spring 78. With a constant pressure, variable flow pump supplying hydraulic fluid to the valve inlet 44, the positioning of the regulating valve spool 42 and thus the land 69 will at all times be a function of the magnitude of the pressure drop across the needle valve 72 and force of spring 78 tending to regulate the flow rate from the variable displacement pump within set limits without regard to downstream pressure. In certain instances it may be possible to dispense with a regulating valve altogether in which case the fluid could be supplied directly to the bore 41 of the closed-center valve spool 43.

In accordance with the invention the closed-center valve spool 43 comprises a valve body 80 having a pair of axially spaced lands 82, 83 thereon, each reciprocatively received in a portion of the bore 41, in the case of land 82, in the vicinity of supply passage 50 and in the case of land 83, in the vicinity of return passage 54. The fluid outlet 52 connects with the bore 41 intermediate the lands 82, 83. A third land 84 on the extreme end of the valve body 80 reciprocates in the bore 41 in the vicinity of a bypass 86 opening into the return passage 55 and the flow through which is regulated by a needle valve 87. Ports 89, 90 in the valve body on opposite sides of the land 83 connect with an axial bleed 91 through the center so as to communicate the bypass 86 with the portion of the bore 41 intermediate the two lands 82, 83. It is important to note that in the equilibrium, closed-center position (FIG. 2), the valve spool 43 is positioned to cover each passage 50, 54, 86 so that no fluid flows to or from the power cylinder 22. It should be noted also that the spacing between the lands 83, 84 is such that movement of the valve spool 43 from the exhaust position with passages 54, 86 uncovered toward the closed-center position will result in the passage 54 being closed in advance of the closure of passage 86 by the land 84 so that momentarily, return flow of fluid from the power cylinder is diverted through port 89, bleed 91, port 90 and bypass 86 which, being restricted by the needle valve 87, tends to dampen the final descent of the implement 14 which comes to rest as the closed-center position of valve spool 43 is reached.

THE VALVE ACTUATING LINKAGE

Figure 4:
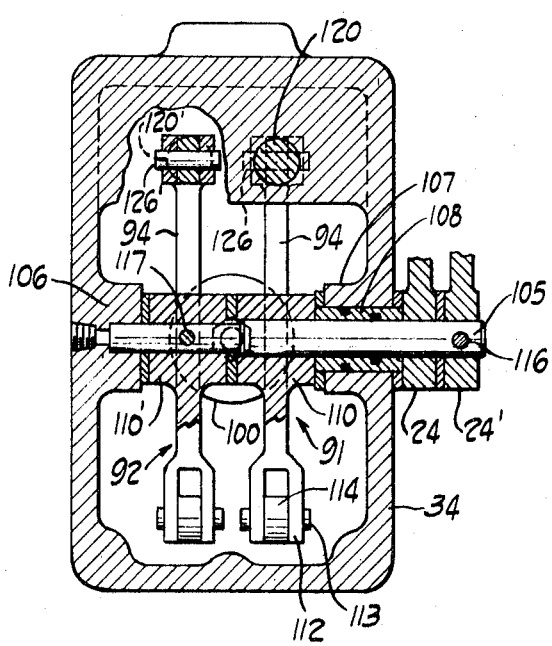
FIG. 4 is a cross-sectional view taken through the linkage box along line 4—4 of FIG. 2 with fragmentary portions of the draft control arm broken away; and, FIG. 5 is an overall schematic diagram of the system.

Referring now to FIGS. 2 and 4, the closed-center valve spool 43 is connected on one end to a valve actuating linkage indicated generally by the numeral 90 which is housed in the linkage box 34. As provided by the invention, the linkage 90 includes a pair of substantially duplicate yoke sub-assemblies 91, 92, one of which is for position and the other for draft control of the closed-center valve spool 43. Inasmuch as parts of the sub-assemblies 91, 92 are identical, the description hereinafter will be with respect to the structure of one and it will be understood as applying equally to the structure of the other and the same numbers will be used to identify like parts in the respective sub-assemblies with the use of a prime mark in the case of numerals identifying parts of the draft control sub-assembly 92.

With respect to the position control sub-assembly 91, a yoke lever 94 has equal length arm sections 95, 96 extending laterally with respect to the center line of the closed-center valve spool 43. Both the position and draft control yokes 94, 94' have a fulcrum point 98, 98' on a plate 100 attached to a one-way link 101 which extends through an opening 102 in the closure plate 64 and into the bore 41 of the valve housing where it is fixedly attached onto the end of the closed-center valve spool 43. A coil spring 104 surrounds the one-way link 101 within the bore 41 and extends between the closure plate 64 and the land 82 biasing the closed-center valve spool 43 from its equilibrium closed-center position toward the right in a direction tending closed supply passage 50 and to uncover exhaust passages 54, 86 for exhausting fluid from the power cylinder 22 for lowering the implement 14.

Movement of the one-way link 101 in opposition to the force of spring 104, either by the position yoke lever 94 or the draft yoke lever 94', shifts the closed-center valve spool 43 from its equilibrium position (FIG. 2) to the left closing passages 54, 86 and uncovering supply passage 50 which connects inlet 44 with outlet 52 thus supplying fluid to the power cylinder 22 for raising the implement 14.

In accordance with the invention, the one-way link 101 is in floating engagement at fulcrum points 98, 98' with the yoke levers 94, 94', either of which is effective to move it in the one direction described, namely, to raise the implement and to limit movement in the opposite direction. The position yoke lever 94, and likewise the draft yoke lever 94', are independently connected to receive on one side commands from the manual control levers 24, 24' (FIG. 1) and on the opposite side, to receive position and draft feedback signals from the hitch 12. The position control lever 24 (a fragmentary portion of which is shown in FIG. 4) is rotatably mounted on an extension of shaft 105 which is journaled in bosses 106, 107 in opposite sides of the linkage box 34. The boss 107 rotatably receives a sleeve 108 which on one end is fixedly attached to the position control lever 24 and on the opposite end to a connecting rod 110 which is journaled on the shaft 105. The rod 110 has a clevis 112 which receives a pin 113 pivotally holding a link 114 which is pivotally connected by a pin 115 at the opposite end to the arm section 96 of the position yoke lever 94.

The draft control lever 24' (FIG. 4) is fixedly connected on the end of shaft 105 by a pin 116 and a connecting rod 110' is fastened by a pin 117 on the shaft 105 for rotation therewith. The connecting rod 110' is operatively connected to the draft yoke lever 94' in exactly the same manner as described with respect to the position yoke lever 94.

Figure 5:
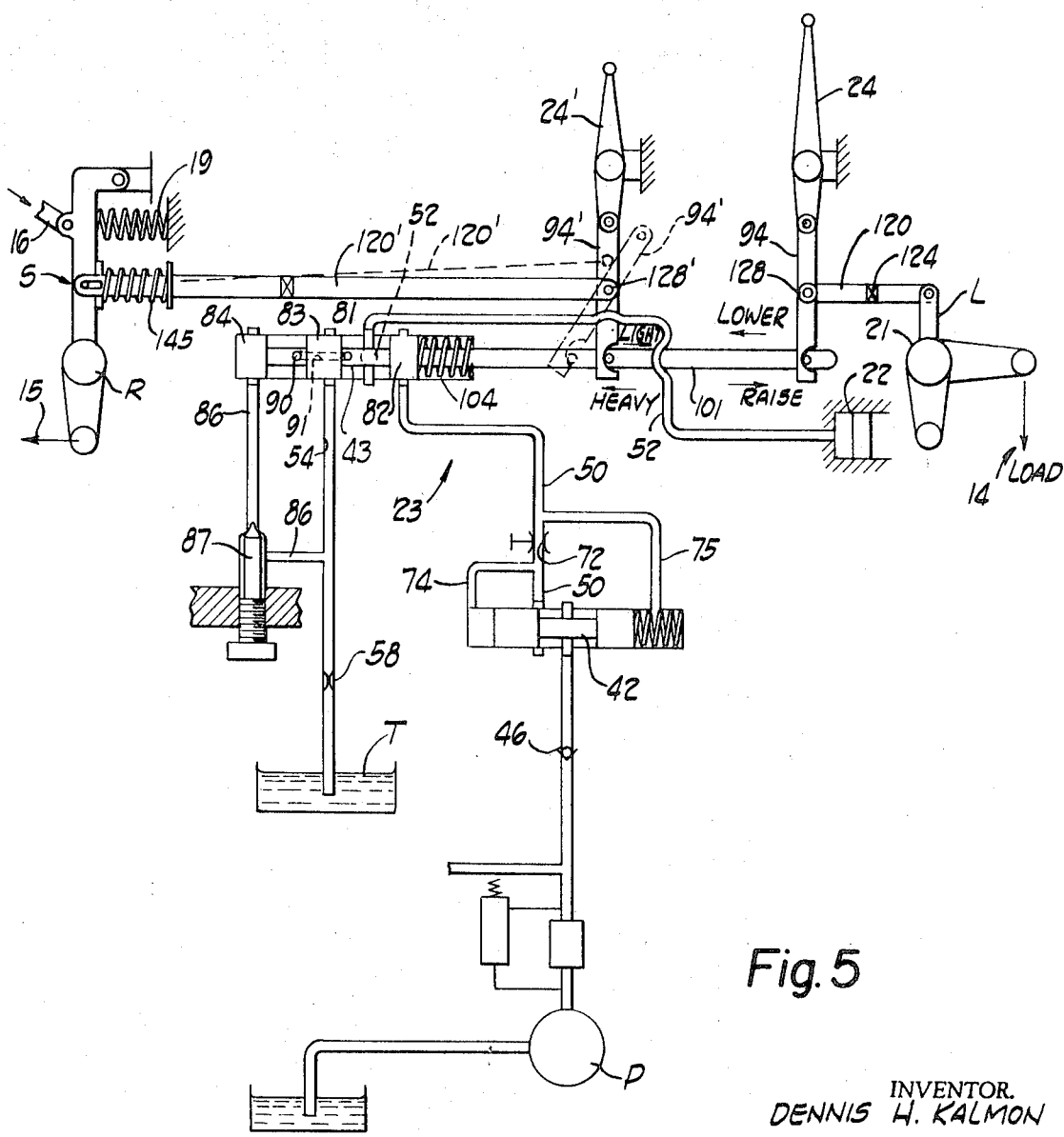

The arm sections 95, 95' of position and draft yoke levers 94, 94' each receive feedback signals transmitted by the hitch 12 which has appropriate connections with both a position feedback push rod 120 and a draft feedback push rod 120', each of which extends through the back cover plate 36 of the linkage box 34. The position feedback push rod 120, for example, can be connected by a pin 126 to a clevis and link arrangement (not shown) operated by the hitch rocker arm 21 (FIG. 1) and correspondingly, the draft push rod 120' can be similarly connected through an appropriate linkage to either the lower draft struts 15 of the hitch or the upper draft struts 16, or may be connected to sense combined upper and lower draft strut loads from an interconnecting link S, as depicted in FIG. 5. The position and draft yoke levers 94, 94', each being reciprocated in response to either the angular position or draft loads of the hitch 12, tend always to restore the valve spool 43 to the closed-center equilibrium position as will be made more apparent by the description of the operation of the control which proceeds hereinafter with respect to the overall system schematic shown in FIG. 5.

POSITION AND DRAFT OPERATION

In accordance with the preferred embodiment of the invention, FIG. 5 shows parts and arrangements of parts in schematic form which correspond to parts identified by the same numbers in FIGS. 1–4.

In FIG. 5, the control 23 is shown connected to a pump P which delivers fluid under pressure through the check valve 46 to the regulating valve spool 42 which is effective for controlling fluid flow rate into supply passage 50 in response to the differential pressures in passages 74, 75 created by the pressure drop across the needle valve 72.

Regulated flow is thus received by the closed-center valve spool 43 which is shown in the closed-center equilibrium position in FIG. 5, as previously described in this position, passage 50 is closed shutting off fluid supply to the fluid outlet 52 leading to the power cylinder 22 and likewise the two exhaust passages 54 and 86 are closed by the lands 83, 84, respectively so that there can be no exhaust of fluid from the power cylinder 22 thus holding the implement 14 (indicated by the arrow marked "load" in FIG. 5) in the required position.

If the operator desires to raise the implement 14 he moves the position control lever 24 to the right as viewed in FIG. 5 which pivots the yoke lever 94 in a direction causing the one-way link 101 to move to the right against the force of coil spring 104 and carrying with it valve spool 43 so that land 82 uncovers passage 50 permitting fluid supply to the power cylinder 22 thus lifting the implement 14. As the rocker shaft 21 of the tractor hitch rotates, a link L, as depicted in FIG. 5, is moved in a counterclockwise direction, which through its connection at 124 with the position feedback push rod 120, causes the movement of the pivot point 128 of the position yoke lever 94 in a direction cancelling out the movement imparted to it by the manual position control lever 24, thus restoring the valve spool 43 to its equilibrium, closed-center position upon the completion of hitch movement.

If it is now desired to lower the implement, the position control lever 24 is moved to the left, as viewed in FIG. 5, which pivots the position yoke lever 94 in the opposite direction permitting the one-way link 101 to move to the left under the influence of spring 104 so that lands 83, 84 of the valve spool 43 uncover the return passages 54 and bypass 86. Fluid in the power cylinder 22 is thus exhausted initially back through outlet 52 and return passage 54, the rate of descent being controlled by the rate spool 58 as fluid is returned to the reservoir tank T. Descent of the implement causes the hitch to transmit a position feedback signal to the push rod 120 causing the one-way link to move in the opposite direction tending to restore the valve spool 43 to its closed-center equilibrium position. However, due to the relative spacing between the lands 83, 84, the return passage 54 is closed before the bypass 86 so that the power cylinder 22 continues to be exhausted through port 89, bleed 91 and port 90 into bypass 86 which is controlled by the needle valve 87 thus damping the final descent of the implement 14 until the valve spool 43 has been returned fully to its closed-center equilibrium position. This is an important advantage over the prior art where the rate at which an implement can be deployed is limited by the fixed flow rate capacity of the control to exhaust fluid from the power cylinder.

Independently of the position manual control lever 24, the operator may set the manual draft control lever 24' for either heavy or light draft response. Movement of the lever 24' to the right as viewed in FIG. 5 sets the draft yoke lever 94', assuming the position yoke lever 94 is set to a slightly lower depth, so as to continuously control the working depth of the implement 14 in accordance with the draft response transmitted to the draft yoke lever 94' by the draft push rod 120'. In FIG. 5 the latter is shown by the broken line as it might be connected to the lever 94' in such a way as to provide adjustable draft feedback signal amplification. The draft feedback signals are transmitted through a control spring 145. Draft forces in excess of those prescribed by the setting of the manual draft control lever 24' are transmitted by the push rod 120' which shifts the pivot 128' to the right as viewed in FIG. 5 moving the draft yoke lever 94' in the direction to shift the valve spool 43 from its closed-center position to uncover supply passage 50. Thus, the power cylinder 22 receives fluid elevating the implement 14 until the draft forces diminish to the magnitude called for by the setting of the control lever 24'. When the draft force has diminished to the required level, the control spring 145, which is normally in compression, will return the pivot point 128' of the draft yoke lever 94' to the prescribed draft position. Movement of the manual control lever 24' in the opposite direction has the effect of increasing the draft response requirement before the closed-center valve spool will be allowed to shift.

When the position control lever 24 is set to a depth at or slightly above the setting of the draft control lever 24', it is possible to achieve a combined control function in which the implement working depth is determined as a coordinated function between the two controls. That is, if the position control lever is set so that the working depth of the implement relative to the tractor frame is fixed then the position control will maintain that depth uniform. However, if a body of hard soil is encountered causing draft forces in excess of the draft setting, it will override the position setting thus raising the implement until the draft forces subside whereupon the position control takes over again to maintain the uniform depth.

As mentioned previously, one of the advantages of the invention is that the valve as well as the actuating linkage comprises an integrated assembly housed in a single casing structure which provides a sealed, oil-tight enclosure for the control. This eliminates one of the disadvantages of the prior art where the actuating linkage is exposed to field conditions. Also, the combined housing takes up less space on the tractor than prior systems where the valve and linkage are not an integrated assembly.

It is important to note that the yoke levers 94, 94' coordinate the command signals received from the manual control levers 24, 24' and the feedback signals transmitted by the hitch to control the position of the closed-center valve spool 43 for maintaining the implement at a constant working depth in spite of varying working conditions. This is accomplished in accordance with the invention by the arrangement whereby the one-way link 101 is not directly coupled to either the draft or position yokes 94, 94', but is floatingly restrained by each in the direction of movement of the valve spool 43 toward the fluid exhaust position under the pressure of spring 104.

Thus, a hitch control is provided having coordinated draft and position functions such that with a position setting for a working depth slightly deeper than the draft setting, the free floating position of the valve spool 43 will be determined independently of the position setting. With the draft setting called for by the control being exceeded, hydraulic fluid will be supplied to the power cylinder to raise the implement until the draft load is decreased.

Conversely if the position control function is set at a working depth relative to the tractor frame above that of the draft setting, the draft control is overridden by the position control so that the working depth of the implement is maintained consistent with the position signal called for by the position control setting independently of the draft response.

Combined draft and position sensing is also possible where, for example, the position control is set to a working depth at or only slightly above that of the draft control setting, in which case either the position or draft control will determine the elevation of the implement relative to the tractor frame depending on the magnitude of the draft forces. If the draft forces increase to a magnitude above that called for by the draft setting relative to the position setting, the position control is overridden and the implement will be raised until the draft forces decrease whereupon the position signal again dominates and takes over the control of the working depth of the implement.

Modifications and changes may be made to the invention as will be apparent to those skilled in the art to which it pertains which modifications and changes are to be regarded as reasonable equivalents thereof and are intended to be covered by the appended claims except insofar as limited by the prior art.

I claim:

1. A control for an agricultural tractor hitch adapted to hitch a ground working implement to the tractor comprising:
   a. a hitch linkage extending trailingly from the tractor and movable in a generally vertical longitudinal plane;
   b. a power cylinder for raising and lowering the hitch linkage;
   c. a valve controlling the power cylinder having a valve member with a closed center equilibrium position shutting off fluid flow to or from the power cylinder when the hitch linkage is properly positioned to establish for an attached implement either a given working depth or desired draft response;
   d. a valve actuating linkage including a yoke means having separate arms, one arm receiving draft and the other arm position command signals, said valve actuating linkage being responsive to movement of said arms for shifting the valve from its closed center equilibrium position establishing the preset depth or draft conditions of the implement and said one arm also receiving draft and the other arm also receiving position feedback signals transmitted by movement of the hitch linkage, said valve actuating linkage being also responsive to said hitch linkage movement for restoring the valve to the closed center equilibrium position and including
   e. a single link element selectively engageable with each of the arms and connected to the valve member such that the single link element is responsive to both command and feedback signals along a line of movement common to each arm, said link element being movable longitudinally in said line of movement in response to movement of either arm for coordinating the command and feedback signals and thereby position said valve in accordance with the preset depth or draft requirements.

2. A control according to claim 1 wherein said single link element includes a plate element secured to said single link element and engageable by either of said arms in a plane transversely of the said common line of movement, the position of which plate element is established either by the draft or position command limits of either of said arms, whichever is greater, and a spring yieldably resisting movement of said valve from its closed center equilibrium position in a direction tending to supply fluid to said power cylinder raising the hitch linkage while said link element is restrained from movement in the opposite direction by said plate element.

3. A control according to claim 1 wherein said valve comprises:
   a. a valve body having an axial bore open at one end;
   b. a valve spool reciprocated in said bore for movement in either direction from the closed center equilibrium position;
   c. said single link element extending into the open end of said bore and being secured to the valve spool;
   d. said yoke means comprising a pair of spaced arms extending parallel to each other on opposite sides of said single link element, one arm being actuated in response to position command and feedback signals and the other to draft command and feedback signals; and
   e. a plate element carried on said single link element engageable with each arm on a line transversely intermediate the ends thereof and passing through said common line of movement of said single link element.

4. A control according to claim 3 wherein a housing is provided combining said valve body with an enclosure for said actuating linkage, said actuating linkage comprising:
   a. a transverse shaft journaled in said wall portions and extending beyond one side of the enclosure;
   b. a sleeve rotatably received in one wall portion circumjacent said shaft;
   c. a pair of manual control levers, one affixed to the shaft and the other to the sleeve;
   d. a pair of connecting rods, one affixed to the shaft and the other rotatable on the shaft and affixed to the sleeve and each being connected to an end of one of said arms for transmitting position and draft command signals thereto; and
   e. a pair of push rods reciprocated in response to hitch linkage movement, each connected to the other end of one of said arms for transmitting position and draft feedback signals thereto.

5. A control according to claim 4 wherein said valve spool comprises:
   a. a first land portion reciprocated in said bore for controlling a fluid supply passage to the power cylinder;
   b. a second land portion reciprocated in said bore for controlling a primary fluid exhaust passage from said power cylinder;
   c. a third land portion reciprocated in said bore for controlling a secondary fluid exhaust passage and positioned relative to said second land portion wherein return fluid flow through said primary exhaust passage is shut off by movement of the valve spool prior to said third land portion shutting off said secondary exhaust passage;

d. other passage means bypassing said second land portion permitting fluid return through said secondary exhaust passage when the primary exhaust passage is closed; and e. flow restriction means in said secondary passage for restricting the flow return and damping the final descent rate of said hitch linkage until said valve spool is returned completely to the closed center position.

6. In an agricultural tractor, the combination of a three-point implement hitch for hitching a ground-working implement to the tractor and a servo control for moving the hitch upwardly and downwardly, the hitch including a pair of trailingly extending lower struts and a single upper strut, the implement having a mast structure adapted to couple with said struts and being raised and lowered thereby relative to the tractor frame into and out of engagement with the ground and also being raised and lowered as it encounters varying working conditions of the soil, and a fluid operated power cylinder for raising and lowering said hitch, said servo control comprising:

a. a valve controlling the power cylinder including a valve spool having a closed center equilibrium position shutting off fluid flow to or from the power cylinder when the implement position or draft is in accordance with a given servo controlled setting;

b. a valve actuating linkage including a pair of parallel arms extending transversely to the axis of the valve spool;

c. a position responsive command and position sensing feedback linkage system pivotally connected to respective ends of one arm;

d. a draft responsive command and draft sensing feedback linkage system pivotally connected to respective ends of the other arm, each said system having command signals imparted manually to establish said given servo controlled setting and being connected to the hitch to receive position and draft sensing feedback signals; and e. a single link element extending between said arms and being engageable by either arm on a line midway between their respective ends and said link element being secured to said valve spool so as to differentially shift said valve spool in response to either the position or draft command or feedback signals.

7. In an agricultural tractor according to claim 6 wherein said draft responsive command and feedback linkage system comprises:

a. a link connected to the hitch to sense draft forces for transmitting the feedback signal to the valve actuating linkage;

b. a draft spring compressible by movement of the link in response to said draft forces and to return the link; and c. adjustable connection means for the link to vary the draft feedback amplification sensed by the valve actuating linkage.

8. In an agricultural tractor according to claim 7, wherein the adjustable connection means is between the link and the valve actuating linkage so as to provide adjustable amplification of the draft feedback signal.

9. A control for use with a tractor implement hitch adapted to be raised and lowered by means of a power cylinder, said control comprising:

a. a valve including a valve spool having a closed center equilibrium position for shutting off fluid flow to or from the power cylinder when the implement position or draft load on the implement is in accordance with a given position or draft control signal;

b. a valve actuating linkage including a differential mechanism coordinating position and draft control signals and transmitting said control signals to the valve spool, said control signals being either position responsive command and feedback signals transmitted by the differential mechanism to the valve spool or draft responsive command and feedback signals transmitted by the differential mechanism to the valve spool, whichever is of greater magnitude;

c. a single link element interconnecting the differential mechanism and valve spool for transmitting the command and feedback signals to the valve spool whereby said valve spool is shifted in response to either the position or draft command or feedback signals in accordance with the present position or draft requirements;

d. a pair of parallel arms extending transversely to the axis of the valve spool, said position responsive command and feedback signals being received by the respective ends of one arm and said draft responsive command and feedback signals being received by the respective ends of the other arm;

e. said single link element being floatingly supported jointly between said arms intermediate their respective ends and in engagement with one of the arms; and, f. biasing means maintaining said link element in engagement with at least one of the arms.

10. The control of claim 9 wherein the biasing means is a spring yieldably holding said single link element in engagement with one of said arms.

* * * * *